United States Patent

Aleynik

[11] Patent Number: 5,810,482
[45] Date of Patent: Sep. 22, 1998

[54] ROLLER BEARING

[76] Inventor: Isaak Aleynik, 3640 Indian Hills. Dr., Apt. 318, Sioux City, Iowa 51104

[21] Appl. No.: 693,903

[22] Filed: Aug. 5, 1996

[51] Int. Cl.[6] .................................................. F16C 33/58
[52] U.S. Cl. ........................ 384/450; 384/564; 384/572
[58] Field of Search ..................... 384/564, 551, 384/565, 575, 572, 450

[56] References Cited

U.S. PATENT DOCUMENTS

| | | | |
|---|---|---|---|
| 1,422,162 | 7/1922 | Zahn | 384/564 |
| 4,558,962 | 12/1985 | Meinlschmidt | 384/564 |
| 4,907,898 | 3/1990 | Dickenson | 384/564 |

*Primary Examiner*—Lenard A. Footland

[57] ABSTRACT

The invention relates to machine engineering and, more particularly, to roller bearings. The roller bearing has an outer ring with a cylindrical raceway and protrusion-free inner surface. An inner ring has a pair of unitary beads, or sides that extend inwardly toward the outer ring. A separator is mounted in an annular space between the inner ring and the outer ring. One of the embodiments provides for the use of one or more additional removable ring beads fitted in the raceway of the outer ring. The removable ring beads can have a rectangular or trapezoidal cross section.

6 Claims, 4 Drawing Sheets

ROLLER BEARING

BACKGROUND OF THE INVENTION

This invention relates to mechanical engineering and, more particularly, to roller bearings.

Conventionally, six types of cylindrical roller bearings are manufactured and used by mechanical engineers. These bearings can have beads on rings and attached beads, including two beads on the inner ring, one bead on the outer ring, made as one unit with the rings and with one bead attached to the outer ring.

All six types of the roller bearings are made separately, without a possibility for interchangeability. Every type of the bearings has its own application, methods of manufacture and use. All six types of the bearings have a bevelled raceway if there is no bead in that raceway.

In order to position an attached bead without increasing the size of a bearing, a corresponding ring is made shorter, or has a step groove, wherein the attached bead is mounted.

An important consideration should be also taken into account when designing roller bearings—a non-fixed end of the shaft with the bearing should be allowed to move in an axial direction. On the one hand such a design will allow a normal operation of the machine preventing outward thrust, while on the other hand, it causes premature damage of a bearing, which moves in an axial direction, or even damage of the whole machine. This problem becomes particularly acute when vibration is present.

This phenomena is due to friction when resistance forces acting perpendicularly on the bearing rings are not present while the bearing is moved in an axial direction. During axial displacement of a bearing the force that allows the inner and outer rings to displace axially does not prevent rotation of the rings.

As a result, the mounting seat wears out, bearing clearance increases, and vibration is present even during normal loads. Additionally, the rings can warp, and the separator becomes jammed or even broken. Sometimes, when the rotation is performed at a considerable speed, the bearing is heated to such a degree that the ring becomes welded to the adjacent unit, as a result of which the entire support is destroyed.

The above noted disadvantages are overcome, to a substantial degree, by my prior USSR patent No. 1,741,615 issued on Feb. 15, 1992. In accordance with that patent, a roller bearing comprises an outer and inner rings, and roller(s) positioned between the rings. The roller(s) have discreet contact surface, while the generating line of the roller(s) has a pre-determined radius which is related to the length of the contact surface as $$\frac{2a}{Lwe} = 0.5; R = \frac{Lwe}{2\varphi},$$

where

2a—is the length of the contact surface;
Lwe—is the effective length of the roller;
R—is the radius of the roller determining line; and
γ—angle of the rings' warp.

While the above ratio works successfully in many applications, it was determined that the roller bearing can be further improved to make it a true universal bearing.

The present invention contemplates elimination of drawbacks associated with prior art roller bearings and provision of an improved roller bearing which can be easily retrofitted from a two-beaded bearing into a three- and four-beaded bearing.

SUMMARY THE INVENTION

It is, therefore, an object of the present invention to provide an improved roller bearing having two beads which can be retrofitted to a three- or four-beaded bearing.

It is another object of the present invention to provide a roller bearing which can withstand some warping of the rings.

It is a further object of the present invention to provide a roller bearing which allows displacement of a free end of a shaft without the damage to the bearing or the entire unit.

These and other objects of the present invention are achieved through a provision of a roller bearing which comprises an outer ring having a cylindrical raceway and a smooth, protrusion-free inner surface. An inner ring is formed with a pair of unitary sides, or beads which extend outwardly from an inner surface of the inner ring toward the outer ring.

A plurality of rollers and a separating member are mounted between the rings. One of the embodiments of the invention provides for one or more additional removable ring beads fitted in the raceway of the outer ring. The removable ring beads can have a rectangular or a trapezoidal cross section. The roller bearing of this embodiment is adapted for use on a fixed end of a shaft, while the roller bearing having unitary beads is designed for use with a movable end of the shaft.

BRIEF DESCRIPTION OF THE DRAWINGS

Reference will now be made to the drawings, wherein like parts are designated by like numerals, and wherein.

DETAIL DESCRIPTION OF PREFERRED EMBODIMENTS

Figure 1:
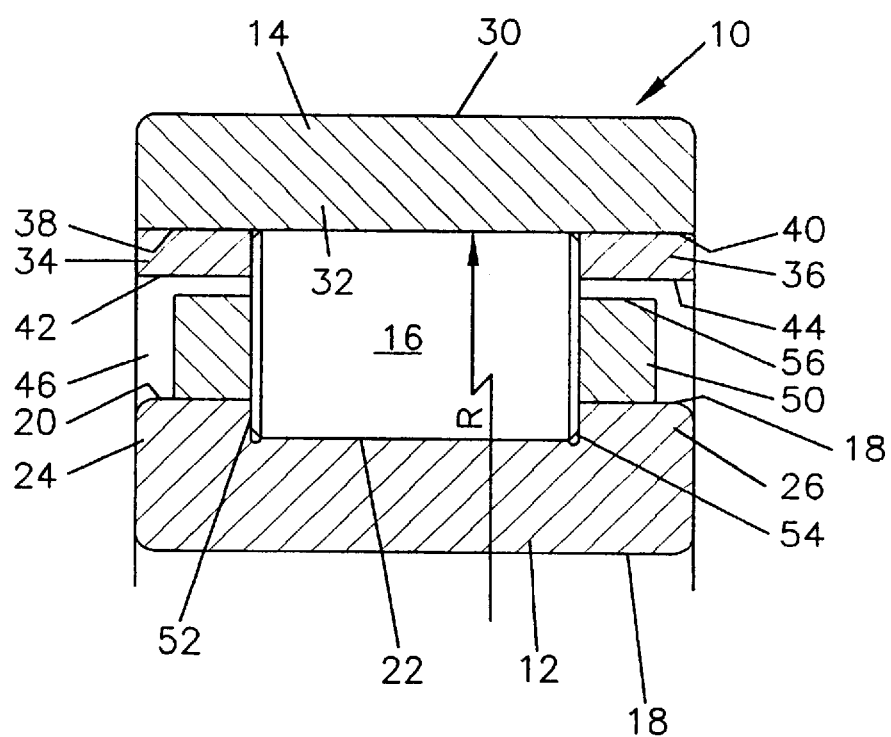
FIG. 1 is a cross-sectional view of the first embodiment of the roller bearing in accordance with the present invention mounted on a fixed end of a rotating shaft.

Referring now to the drawings in more detail, numeral 10 designates a first embodiment of the roller bearing in accordance with the present invention. The bearing 10 has a cylindrical raceway and comprises an inner ring 12 and an outer ring 14. A plurality of generally cylindrical rollers 16 are positioned between the rings 12 and 14.

The inner ring 12 has an outer surface 18 and an inner surface 20. A recess 22 is formed in the inner surface 20 to accommodate at least a part of the rollers 16. The body of the inner ring 12 extends on opposite sides of the rollers 16 forming a pair of outwardly extending sides, or ring beads 24, 26 which are unitary connected to the inner ring 12.

The outer ring 14 has a generally rectangular cross section and is provided with an outer surface 30 and an inner surface 32 oriented in a parallel relationship to the outer surface 30. The inner surface 32 of the outer ring 14 is smooth and protrusion-free, it has no angular sides, extensions, ring beads, flanges or grooves. As can be seen in the drawings, the outer ring 14 has a cylindrical raceway and the width of the ring 14 is substantially equal to the width of the entire roller bearing 10.

One or more removable added sides, or ring beads 34, 36 are inserted within the raceway of the outer ring 14. The inserted beads 34, 36 have a rectangular cross section and the same width as the outer ring 14.

One surface 38, 40 of the beads 34, 36, respectively, contacts the inner surface 32 of the outer ring 14, while the opposite surface 42, 44 of the beads 34, 36, respectively, faces an annular space 46 formed between the rings 12 and 14. As can be seen in FIG. 1, the surfaces 42, 44 extend in a parallel relationship to the surfaces 30, 32 and 38, 40.

A separating member, or separator 50 is mounted in the annular space 46 between the rings 12 and 14, extending on opposite transverse ends 52, 54 of the rollers 16. The separator 50 follows the general configuration of the inserts, or beads 34, 36, and more particularly the surfaces 42 and 44 thereof.

Figure 2:
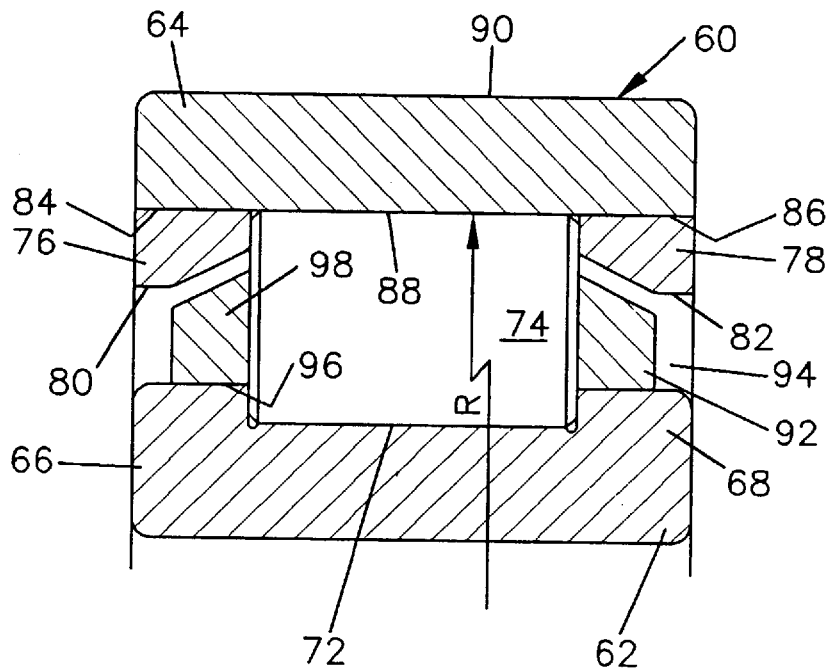
FIG. 2 is a cross-sectional view of the second embodiment of the bearing in accordance with the present invention mounted on a fixed end of a rotating shaft.

FIG. 2 illustrates a second embodiment of a roller bearing in accordance with the present invention. The roller bearing 60, similarly to the roller bearing 10, has an inner ring 62 and an outer ring 64. The inner ring 62 is provided with a pair of unitary beads 66, 68 extending from an inner surface toward the outer ring 64. A recess 72 is formed between the beads 66, 68. At least a portion of cylindrical rollers 74 is received with the recess 72.

One or more added removable beads 76, 78 are fitted in a cylindrical raceway of the outer ring 64. The added beads 76, 78 have a generally trapezoidal cross section, with inclined surfaces 80, 82, respectively, forming a non-contact surface of each of the beads. The contact surfaces 84, 86 of the beads 76, 78, respectively, are oriented in parallel relationship to an inner surface 88 of the outer ring 14.

Figure 5:
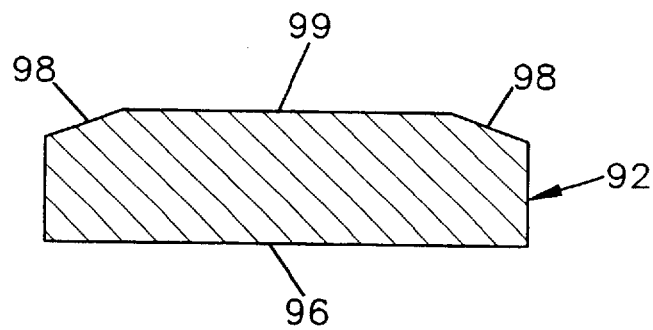
FIG. 5 is a cross sectional view of a separating member of the second embodiment of the roller bearing in accordance with the present invention.

A separating member 92 is mounted in an annular space 94 between the rings 62 and 64. The separating member 92 has a straight contact surface 96, which contacts the unitary beads 66, 68, and a pair of inclined non-contact surface portions 98. A central part 99 of the non-contact surface of the separator 92 (see FIG. 5) is straight, oriented in parallel relationship to the contact surface 96 of the separator 92. The inclined surface portions 98 of the separator 92 are oriented in a substantially parallel relationship to the surfaces 80, 82 of the beads 76, 78, that is at an acute angle to a longitudinal axis of the roller bearing 60.

It should be noted that the preferred embodiment would contain only one type of beads in one roller bearing, that is both beads will have either rectangular or trapezoidal cross sections. Of course, it is possible, though not necessary, to utilize combination beads in one roller bearing, that is one bead with a rectangular cross section, and another bead with a trapezoidal cross section. It is also possible to make beads 34, 36 and 76, 78 as one piece, as opposed to a two-piece construction shown in FIGS. 1–4.

Figure 3:
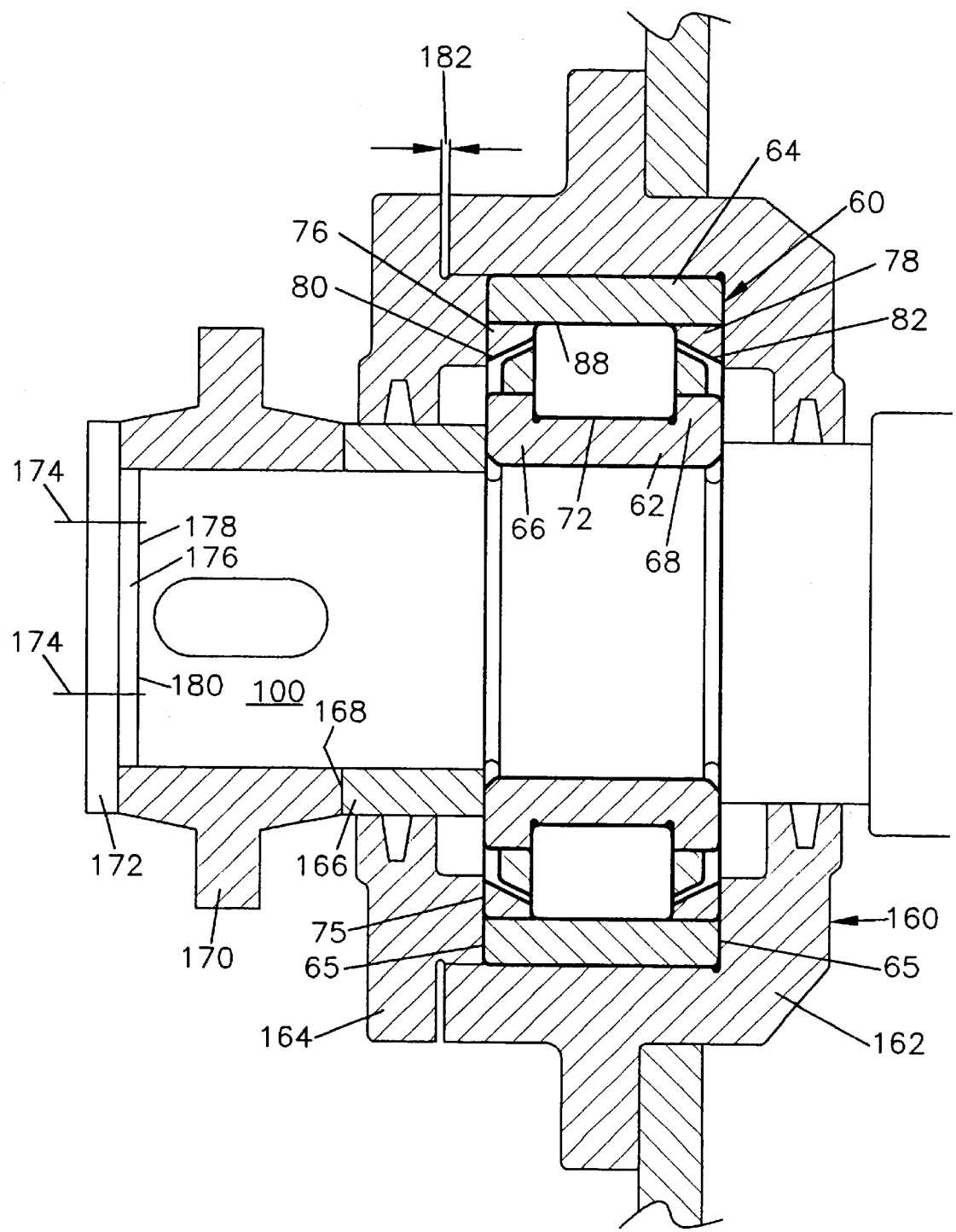
FIG. 3 is a cross-sectional view of a fixed bearing with two beads, two of which are added, removably mounted on a stationary end of a shaft of, for example, a vibrating screen apparatus.

Turning now to FIG. 3, the bearing 60 is shown installed in a fixed axial position on a shaft 100 of a vibrating screen 160. The vibrating screen 160 has a support member 162 and a support cover 164, portions of which contact the body of the bearing along the transverse ends 65 of the outer ring 14 and along the narrow ends 75 of the beads 76, 78.

A spacing sleeve 166 contacts at least a portion of one end of the inner ring 62. An opposite end of the sleeve 166 is in contact with a hub 168 of a drive 170.

As can be further seen in FIG. 3, a thrust washer 172 extends about a free end of the drive 170. The washer 172 is provided with a plurality of apertures adapted to receive bolts 174 therethrough. A corresponding number of aligned openings are formed in a free end of the shaft 100 to the receive the bolts 174 and secure the washer 172 to the shaft 100.

The longitudinal dimension of the drive 170 is slightly greater than the length of the shaft 100, so that a clearance 176 is formed between an interior surface 178 of the washer 172 and a free end 180 of the shaft 100. This arrangement allows to securely fix the position of the inner ring 62 of the bearing 60. A second clearance 182 formed between the support cover 164 and the support member 162 ensures fixed position of the outer ring 64 and the beads 76, 78.

When the shaft 100 of FIG. 3 rotates, its axis remains stationary. Any possible axial loads are transferred to the beads which are additionally secured by the cover and the housing. Stationary position in an axial direction is ensured by the added beads 76, 78 fitted in a raceway of the outer ring 64.

It should be noted that the vibrating screen 160 forms no part of the present invention; it is shown for illustrative purposes only since the bearing 60 can be successfully used in other types of machines where roller bearings are required.

Figure 4:
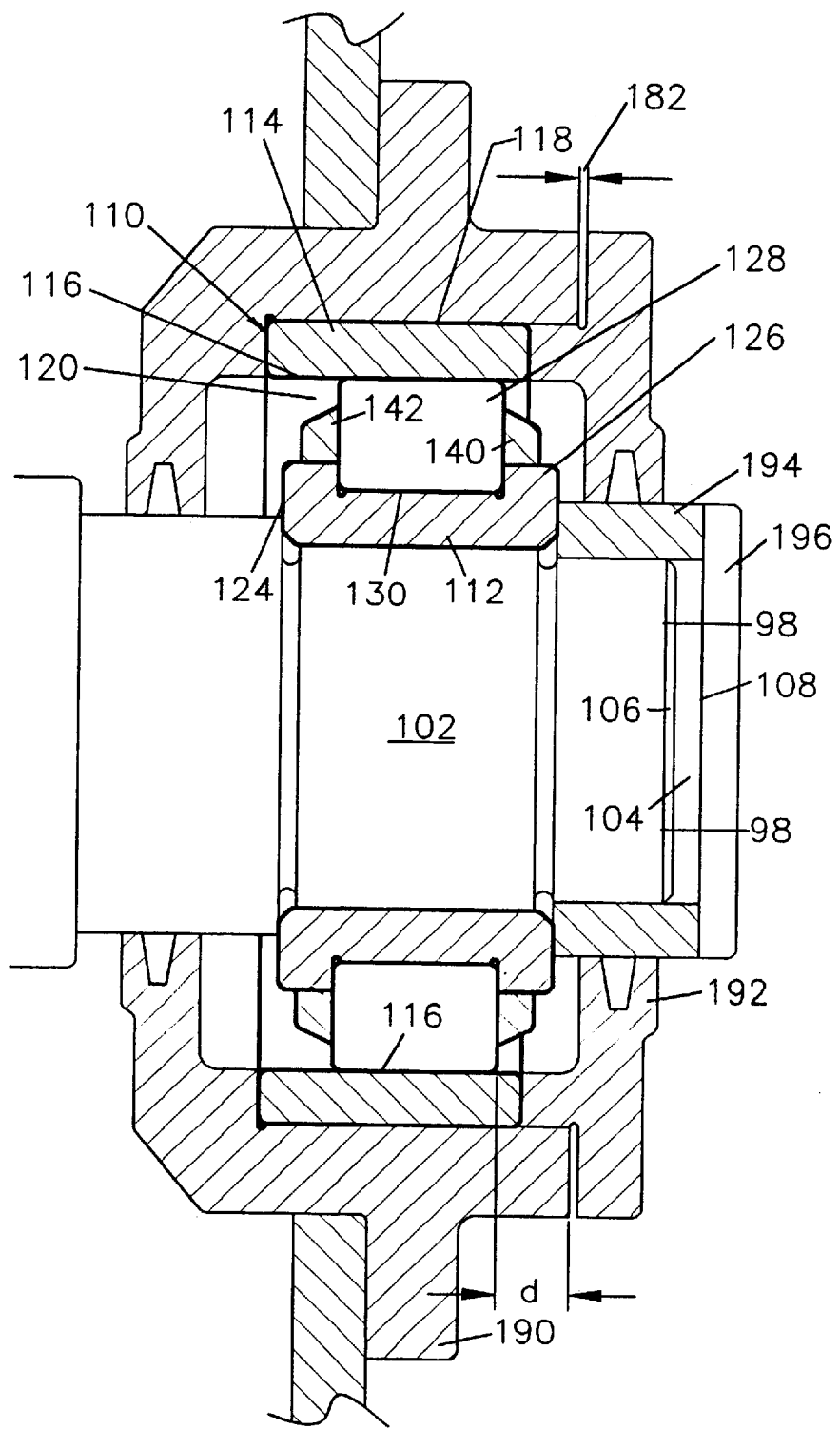
FIG. 4 is a cross-sectional view of the third embodiment of the bearing in accordance with the present invention mounted on a movable end of the shaft, with both inner and outer rings of the bearing being fixed.

Turning now to FIG. 4, the third embodiment of the bearing in accordance with the present invention, particularly adapted for use on a non-fixed end of a shaft, is shown mounted on a movable end of the shaft 102 in a shifted position. Axial movement of this end of the shaft is provided through the raceway of the bearing, which is designates by numeral 110 in the drawing.

In this embodiment, the bearing 110 is provided with only two beads 124, 126 on the inner ring 112. The beads 124, 126 extend toward an outer ring 114. A plurality of rollers 128 are mounted, at least in part, within a recess 130 formed between the beads 124, 126 of the inner ring 112. A separator 140 is mounted in the annular space between the inner ring 112 and the outer ring 114, contacting inner surfaces of the beads 124, 126. Portions 142 of a non-contact surface of the separator 140 are shown formed at an angle to a longitudinal axis of the roller 110, similarly to the separator shown in FIG. 5.

As can be further seen in FIG. 4, the outer ring 114 has a rectangular cross section, with an inner surface 116 of the outer ring 114 being protrusion free, with no conical cuts or grooves formed thereon. It should be noted that a conventional roller bearing design provides for conical sides or flanges to be formed on an inner surface of the outer ring. The present invention provides for the inner surface 116 to be smooth and protrusion free, without any inwardly extending sides, beads or flanges. The raceway of the outer ring 114 has a cylindrical shape, without any conical sides or inclined surfaces.

The outer ring 114 is securely mounted in a support member 190 with the help of a cover 192. A clearance 194 is retained between the support member 190 and the cover 192. The inner ring 112 is similarly secured on the shaft 102 by a sleeve 194, washer 196 and securing bolts 198. A clearance 104 is formed between an end 106 of the shaft 102 and an inner surface 108 of the washer 196.

It is preferred that the width of the outer ring 114 be substantially equal to the width of the entire bearing 110. As a result, the inner ring 112, along with the rollers 128 and the separator 140 can axially move along with the end of the shaft 102 to a distance designated by letter "d" in FIG. 4.

The third embodiment of the present invention ensures a stationary position of tne outer ring of the bearing, while allowing only the inner ring and the separator to move in an axial direction. At the same time, both the outer ring and the inner ring are securely fixed with the shaft.

This feature becomes particularly important when vibration forces act on the bearing. The present invention provides advantages which cannot be achieved through the use of conventional designs where all elements of a bearing, including the outer ring, move.

In case if the additional beads 120, such as shown in phantom lines in FIG. 4 are mistakenly retained in the bearing 110, they will not affect a satisfactory operation of the bearing 110, that is the movement within the above described distance "d" can still be accomplished.

The preferred embodiment of the present invention provides for the outer ring to have substantially the same width as the entire bearing. It is also preferred that the rollers have a radial dimension and a discreet length which can be expressed in a pre-determined relationship to the angle of the rings' warp, and that the contact surface has a certain ratio with the effective length of the rollers. This relationship can be expressed by the following eqaution $$\frac{Lwe}{2\phi} = R \text{ and } \frac{2a}{Lwe} = 0.45 \div 0.55,$$

where

Lwe is the roller' effective length;

γ is an angle of the rings' warp;

R is a radius of the roller's determining line; and 2a is the length of a contact surface.

It is envisioned that manufacturing of the bearings in accordance with the present invention can be significantly simplified because a manufacturer can produce a desired quantity or bearings 110 and a plurality of various profile ring beads. A retailer or consumer can buy the basic roller bearing 110 and then position the selected ring beads with rectangular or trapezoidal cross section in nLe cylindrical raceway of the outer ring, depending on the preferred appilcation.

The bearings 10, 60 and 110 of the present invention can be manufactured from thin pipes, and the additional ring beads can be similarly made from thin pipes. The bearings in accordance with the present invention have a more simpified construction, are less expensive to manufacture and are believed to have longer useful life than conventional roller bearings.

Many changes arnd modifications can be made in the design of the present invention without departing from the spirit thereof. I, therefore, pray that my rights to the present invention be limited only by the scope of the appended claims.

I claim:

1. A roller bearing device, comprising:

an outer ring having a substantially smooth, protrusion-free inner surface;

an inner ring having an inner surface provided with a central recess and a pair of beads formed unitary with said inner ring and extending inwardly on opposite sides of said recess;

a plurality of rollers mounted at least in part in said central recess of the inner ring between said outer ring and said inner ring;

at least one removable additional ring bead fitted in a raceway of a said outer ring and engaging opposite ends of said roller, wherein said at least one additional ring bead has a trapezoidal cross section, and inner surface and an outer surface which contacts said inner surface of the outer ring, and wherein at least a part of said inner surface of said at least one additional ring bead is oriented at an angle to said outer surface of said at least one additional ring bead.

2. A roller bearing device, comprising:

an outer ring having a substantially smooth, protrusion-free inner surface;

an inner ring having an inner surface provided with a central recess and a pair of beads formed unitary with said inner ring and extending inwardly on opposite sides of said recess;

a plurality of rollers mounted at least in part in said central recess of the inner ring between said outer ring and said inner ring; and a separating member mounted between said inner ring and said outer ring, said separating member having a trapezoidal cross section and an inner surface which contacts at least a portion of said inner ring, and wherein a pair of additional ring beads are removably fitted in a raceway of said outer ring, each of said additonal ring beads having a substantially trapezoidal cross section with an angularly inclined surface which is oriented in a substantally parallel relationship to an angular surface of said separating member.

3. A roller bearing device, comprising:

an outer ring having a substantially smooth, protrusion-free inner surface;

an inner ring having an inner surface provided with a central recess and a pair of beads formed unitary with said inner ring and extending inwardly on opposite sides of said recess;

a plurality of rollers mounted at least in part in said central recess of the inner ring between said outer ring and said inner ring; and wherein said outer ring has a discrete width substantially equal to a width of said bearing, and each of said rollers has discrete dimensions determined according to $$\frac{Lwe}{2\phi} = R \text{ and } \frac{2a}{Lwe} = 0.45 \div 0.55,$$

where

Lwe is an effective length of a roller,

γ is an angle of rings' warp,

R is a radius of a roller's determining line, 2a is a length of a contact surface.

4. A roller bearing device, comprising:

an outer ring having a pair of outwardly extending unitary beads formed on opposite sides of an inner surface of said inner ring;

a plurality of rollers mounted at least in part between said unitary beads of said inner ring;

a separating member mounted between said inner ring and said outer ring, said separating member contacting at least a portion of said unitary beads;

at least one removable additional ring bead mounted in the raceway of said outer ring and extending on opposite ends of said rollers, said at least one additional ring bead having a generally trapezoidal cross section; and wherein said separating member has a generally trapezoidal cross section and an inclined surface oriented in parallel relationship to an inclined surface of said at least one additional ring bead.

5. A roller bearing device, comprising:

an outer ring having a pair of outwardly extending unitary beads formed on opposite sides of an inner surface of said inner ring;

a plurality of rollers mounted at least in part between said unitary beads of said inner ring;

a separating member mounted between said inner ring and said outer ring, said separating member contacting at least a portion of said unitary beads;

at least one removable additional ring bead mounted in the raceway of said outer ring and extending on opposite end of said rollers; and wherein said outer ring has a discrete width substantially equal to a width of the roller bearing, and wherein each of said rollers has discrete dimensions determined according to $$\frac{Lwe}{2\phi} = R \text{ and } \frac{2a}{Lwe} = 0.45 \div 0.55,$$

where

Lwe is roller's effective length

γ is angle of ring's warp,

R is raduius of the roller's determining line, and 2a is length of a contact surface.

6. A roller bearing device, comprising:

an outer ring having a substantially smooht, protrusion-free inner surface, a discreet width substantially equal to a width of said bearing and a cylindrical raceway;

an inner ring having a pair of unitary beads extending inwardly from an inner surface of said inner ring;

a plurality of rollers mounted between said inner ring and said outer ring;

a separating member mounted between said inner ring and said outer ring;

a pair of additional removable ring beads fitted in the raceway of said outer ring; and wherein each of said rollers has discreet dimensions determined according to $$\frac{Lwe}{2\phi} = R \text{ and } \frac{2a}{Lwe} = 0.45 - 0.55,$$

where

Lwe is a roller's effective length,

γ is angle of the rings' warp,

R is radius of the roller's determining line, and 2a is length of a contact surface.

* * * * *